United States Patent [19]
Krosse et al.

[11] Patent Number: 5,356,575
[45] Date of Patent: Oct. 18, 1994

[54] METHOD FOR CONTROLLING THE TREND OF THE CHANGE-OVER POINT

[75] Inventors: Dietmar Krosse, Wiehe; Helmut Schreiner, Nuremberg; Ulrich Reichstein, Wiehe, all of Fed. Rep. of Germany

[73] Assignee: Mannesmann Aktiengesellschaft, Düsseldorf, Fed. Rep. of Germany

[21] Appl. No.: 955,080

[22] Filed: Oct. 1, 1992

[30] Foreign Application Priority Data

Oct. 1, 1991 [EP]  European Pat. Off. ...... 91 250 266-3

[51] Int. Cl.⁵ .............................................. B29C 45/76
[52] U.S. Cl. .............................. 264/40.1; 264/40.5; 264/40.6; 264/328.1; 425/135; 425/144; 425/145; 425/149; 425/155; 425/159
[58] Field of Search ............. 264/40.1, 40.5, 40.6, 264/328.1; 425/135, 143, 144, 145, 149, 155, 159, 162

[56] References Cited

U.S. PATENT DOCUMENTS

| | | | |
|---|---|---|---|
| 3,750,134 | 7/1973 | Weisend | 425/145 |
| 3,932,083 | 1/1976 | Boettner | 425/145 |
| 4,311,446 | 1/1982 | Hold et al. | 425/145 |
| 4,828,473 | 5/1989 | Otake et al. | 425/145 |
| 5,173,223 | 12/1992 | Kamiguchi et al. | 264/40.1 |

Primary Examiner—Jill L. Heitbrink
Attorney, Agent, or Firm—Schweitzer Cornman & Gross

[57] ABSTRACT

In a machine for injection molding thermoplastic materials in a molding tool by seriatim injection cycles, wherein an injection pressure stage and a subsequent holding pressure stage are employed, and wherein parameters of a change-over point from the injection pressure to the holding pressure have a trend of varying, a method for regulating the trend of the change-over point in each injection cycle, involving (a) establishing upper and lower pressure, and time boundary target parameters for a working window, (b) establishing upper and lower temperature boundary target parameters for a working band, (c) defining the change-over point within said working window, by specifying a pressure, at a given time, (d) measuring the actual pressure at the time of changing from the injection pressure to the holding pressure, and detecting any pressure and time differences from the boundary target parameters of the working window, (e) measuring the actual temperature, and detecting any temperature differences from the boundary target parameters for the working band, (f) shifting the change-over point in proportion to the detected differences, subject to the conditions that the (i) changing of the time is in the same direction as any detected difference, (ii) changing of the pressure is in the opposite direction from any detected difference, and (iii) changing of the temperature in the same direction as the detected difference, and of the pressure is in the opposite direction of the detected difference.

7 Claims, 4 Drawing Sheets

METHOD FOR CONTROLLING THE TREND OF THE CHANGE-OVER POINT

FIELD OF THE INVENTION

The invention relates to a method and an apparatus for controlling the trend of the change-over point from injection pressure to holding pressure in injection molding machines for processing thermoplastic molding compositions.

BACKGROUND OF THE INVENTION

In injection molding, the process of forming the molded article usually is divided into three phases, filling, injection pressing and holding pressing. During injection pressing, the cavity volume is filled and the thermoplastic material is consolidated, while a great pressure increase takes place in the molding tool. This pressure reaches its highest value at the end of the injection pressing phase.

In the subsequent phase, the molded article cools off. At the same time, its volume decreases. During this phase, further material is supplied at a constant pressure level to the material that is already in the cavity.

If the process is to be conducted in an optimum manner, the selection of the change-over point, adhering precisely to this change-over point and the reproducibility in each injection molding cycle are of great importance. Fluctuations in the change-over point have an effect on the internal pressure of the molding tool and, with that, on the quality of the molded part.

If the change-over point occurs too early or at too low a switching pressure, there is a break in the internal pressure of the molding tool, which results in surface markings due to a brief, partial freezing of the flow front.

If the change-over comes too late, a pressure peak results with the negative consequence of a reduction in the quality of the molded part in the form of flash. Excessive pressure can also lead to damage to the molding tool.

German published patent application No. 2,443,930 discloses a method with appropriate apparatus, in which the change-over point is shifted by shifting the mold gap splitting time or the mold gap splitting path and the total energy supplied to the mold cavity is used as a basis for the correcting variable that determines the degree, to which the mold is filled in the holding phase. To carry out the method, it is proposed that a measuring element for the mold gap or the internal pressure of the mold be disposed in the region of the cavity.

The proposed method and its equipment are not only sluggish, but are also disposed at places, at which the molding tool may be damaged and which, moreover have a negative effect on the quality of the molded part.

In the specification of the European patent publication No. 233 548 A 2, a method is disclosed for regulating and controlling and/or monitoring the injection molding process and equipment is shown for carrying out the method, in which the pressure and time signals are used to control, regulate and/or monitor the molding process. The identified deviations are used to change the process parameters, such as the injection speed, pressure or stroke, the mass temperature and/or the molding tool temperature for the next cycle of the machine.

This method is relatively sluggish and has, moreover, the disadvantage that changes are made in the process parameters, which are not involved causally in the shift of the change-over point from injection pressure to holding pressure and, moreover, are shifted from their optimum operating point to less favorable areas.

It is to be understood that reference in the specification and the claims to "pressure", also means reference alternatively to the prevailing force which is interchangeable proportional to the pressure, and reference to "time", also means reference alternatively to the path which is interchangeably proportional to the time.

OBJECT OF THE INVENTION

It is an object of the present invention to avoid the disadvantages mentioned for injection molding machines and to provide a reliable and sensitive method for controlling the trend as well as for monitoring the change-over point when changing over from the injection pressure phase to the holding pressure phase.

SUMMARY OF THE INVENTION

Measuring elements are disposed to determine the temperature, pressure or force data, as well as the path or time, at places, at sites where they are protected and do not substantially interfere with the process. Preferably, the pressure of the hydraulic equipment or the force of the closing unit is determined, since it is easy to mount pressure transducers on this equipment and these transducers do not interfere with the molded part in the cavity.

A timer on the processor determines the time. To determine the path, measurement elements are disposed on the screw, since the sensors can be disposed reliably on this component and require little maintenance there.

Pursuant to the invention, the pressure (or force)-/time (or path) working window is divided into the following areas: (i) core area, (ii) ring area, and (iii) wing area.

In the narrow core area, the change-over point is left unchanged despite a slight shift. With this, fuzzinesses in the measurements are caught and the change-over point system is not unnecessarily disturbed.

Only after leaving the core area and entering the ring area is the change-over point actively changed. In this connection, not only is the trend of the migration of the change-over point observed and noted, but there is also a reaction appropriate to the magnitude of the shift. If the change-over point is in the ring area, the change-over point is rapidly but carefully regulated, moreover, without directly changing any of what are now the process parameters.

If thus the upper limit, within the tolerance zone of the time (or of the path), namely the inner edge of the ring area, is exceeded, a correction is carried out in the same direction, that is, the time portion of the change-over point is also enlarged. On the other hand, if the lower edge of the ring field is exceeded by the change-over point due to increasing pressure (or a force), a change occurs in the opposite direction, namely, the pressure portion of the change-over point is lowered.

The process parameters are affected only after leaving the working window and entering a wing area.

Monitoring the temperature, namely the mass or the molding tool temperature, is superimposed on the observation of the trend of the change-over point with respect to pressure or force as well as time or path. For this temperature, a tolerance band is provided, which has a core and an edge region, as well as a wing region.

The time of measuring said temperature depends on the time or the path parameter of the change-over point. A knowledge of the position of the actual temperature point is used to influence the position in the working window of the change-over point.

In this connection, a situation can occur that the change-over point should be shifted to a field of lower pressure on the basis of the pressure measurement and to a field of higher pressure on the basis of the temperature measurement and thus, in the end result, does not have to be moved at all. Such decisions, which are correct when added up, contribute to the stabilization of the measurement and the control system.

Knowing the trend of the movement of the change-over point, it is possible to recognize in good time when and where the change-over point presumably will leave the ring area and into which wing area it will migrate. There is thus the possibility of making the identifiably correct decision clearly earlier than usual and, upon reaching the wing area, changing the process parameters that promise the greatest success technically and tactically.

DESCRIPTION OF THE DRAWINGS

An example of the invention is shown in the drawings, in which.

DETAILED DESCRIPTION OF THE INVENTION

Figure 1:
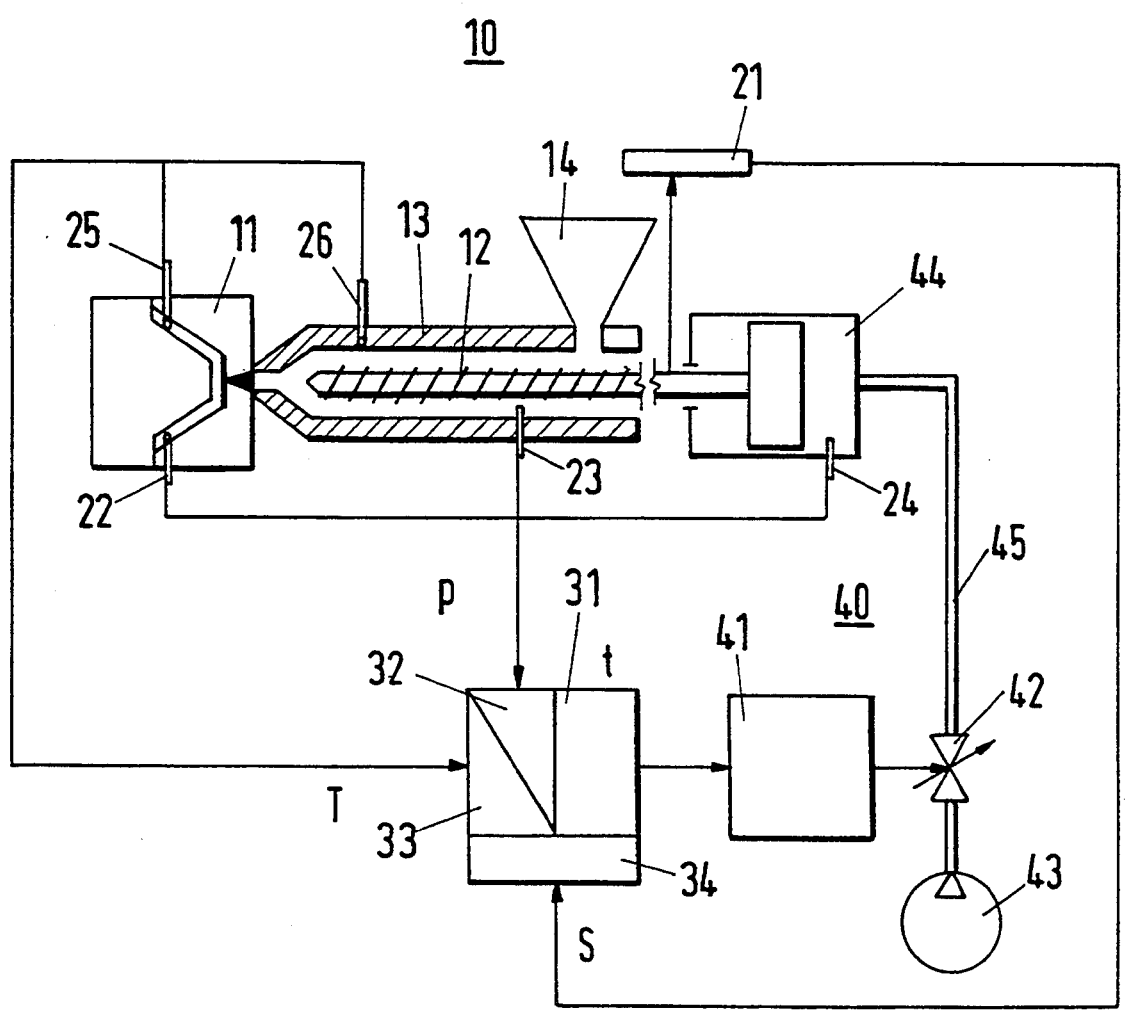
FIG. 1 is a schematic view of an injection molding machine, including the measurement and control facilities.

FIG. 1 schematically shows an injection molding machine 10 with a screw 12 in an extruder barrel 13 provided with a material feed mechanism 14. The extruder barrel 13 is connected to a molding tool 11. The screw 12 is driven by a pressure cylinder 44 of a hydraulic driving mechanism 40.

The following measurement sensors are provided on the injection molding machine 10 and the driving mechanism 40:

a path sensor 21 for measuring the path 5 of the screw;

pressure sensors 22 and 23 for measuring the pressure p in the mold cavity and in the extruder barrel;

pressure sensor 24 for measuring the pressure p in the hydraulic driving mechanism 40; and respective temperature sensors 25 and 26 for measuring the temperature T respectively in the mold cavity, and in the extruder barrel.

The measurement signals for the distance s, the pressure p and the temperature T are supplied to a processor 30, for collecting and processing signals. The processor 30 has processing elements for pressure 32, temperature 33 and for the path 34, as well as a time counter 31 for the time t.

The four processing elements 31 to 34 can be linked together in a convenient manner. For example, the exact position s of the screw at a particular time t can be checked.

The pressure p or the temperature T can be scanned for reliably knowing the exact time/position situation.

For control purposes, the processor 30 is connected with the change-over control mechanism 41 of the driving mechanism 40. The change-over control mechanism 41 is connected with a change-over element 42, which is disposed in the hydraulic line 45 that lies between the pump 43 and the pressure cylinder 44.

Figure 2:
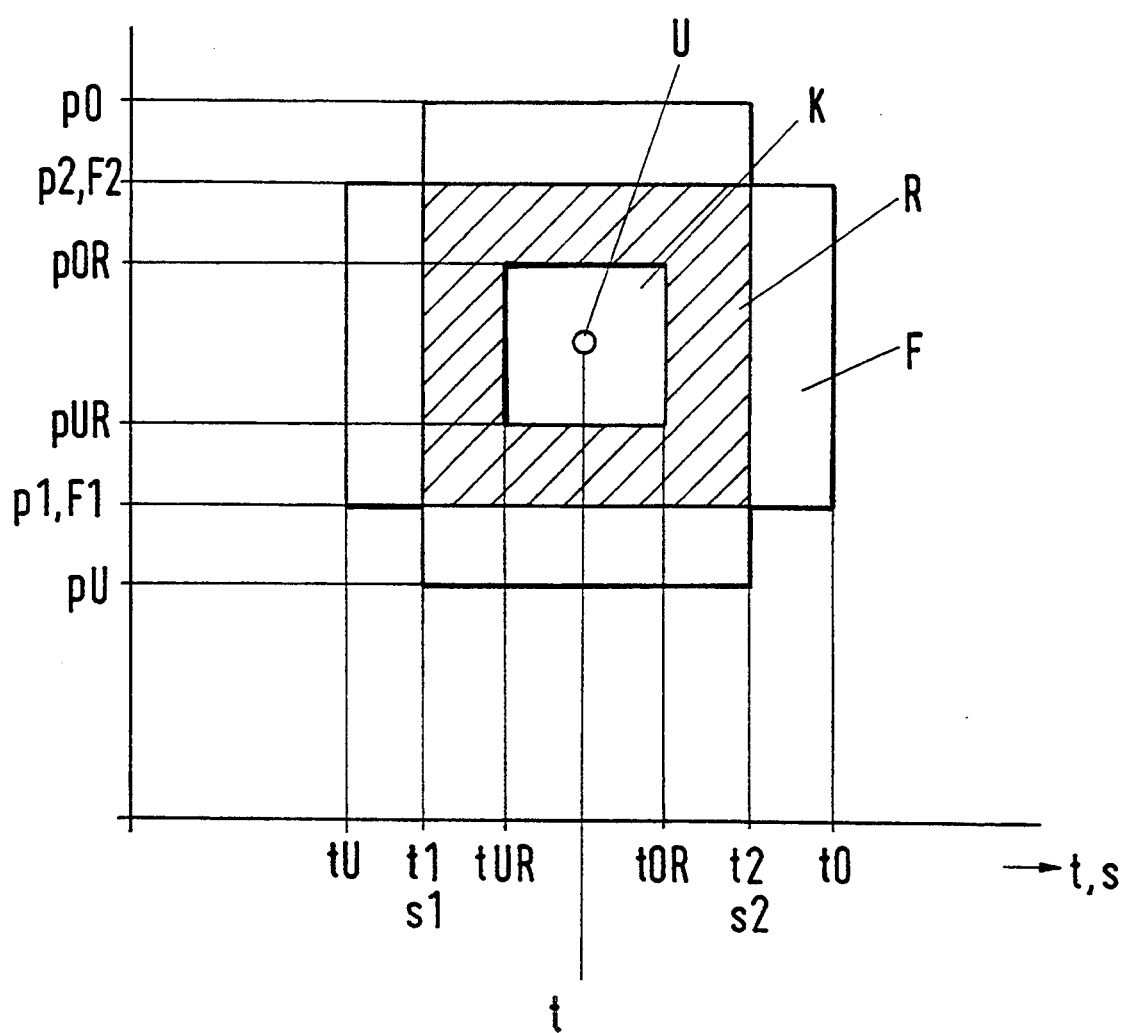
FIG. 2 is a schematic view of a working window.

FIG. 2 shows the working window for pressure p or force F and time t or the distance s.

The window is divided into a core area K, a ring area R and a wing area F.

The ring area, which adjoins the core as well as the wing area, is bounded by p2, F2 as well as p1, F1 and t1, f1 as well as t2, f2 as outer border and by pOR, pUR, tOR, tUR as inner border. The desired position of the change-over point U is in the core area K.

Figure 3:
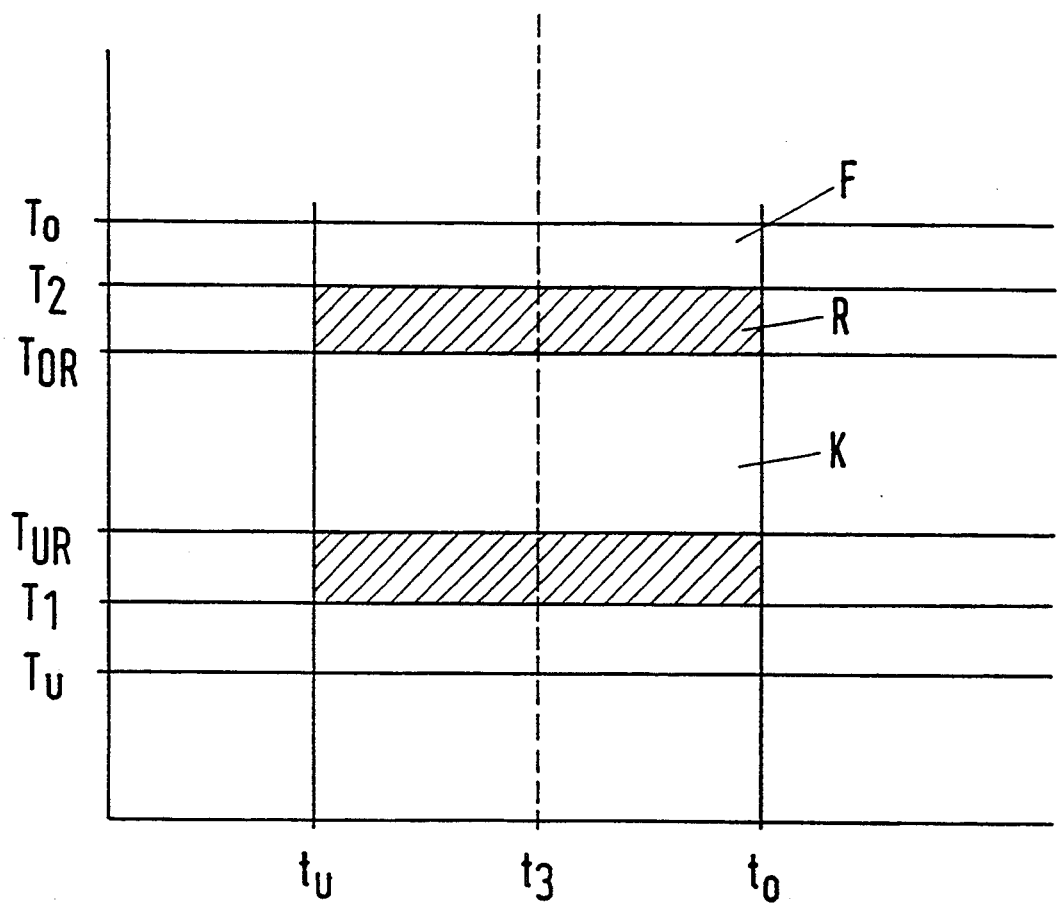
FIG. 3 is a schematic view of a working band.

FIG. 3 shows the working band with the outer temperature boundaries To and Tu, which define the wing area F. The band, which is between T2 and Tor, as well as between Tur and T1, is labeled R. The core area K is defined by Tor and Tur. The total band is cut off by the boundaries tU and tO. The time point t3 is between the time limits tu and to.

Figure 4:
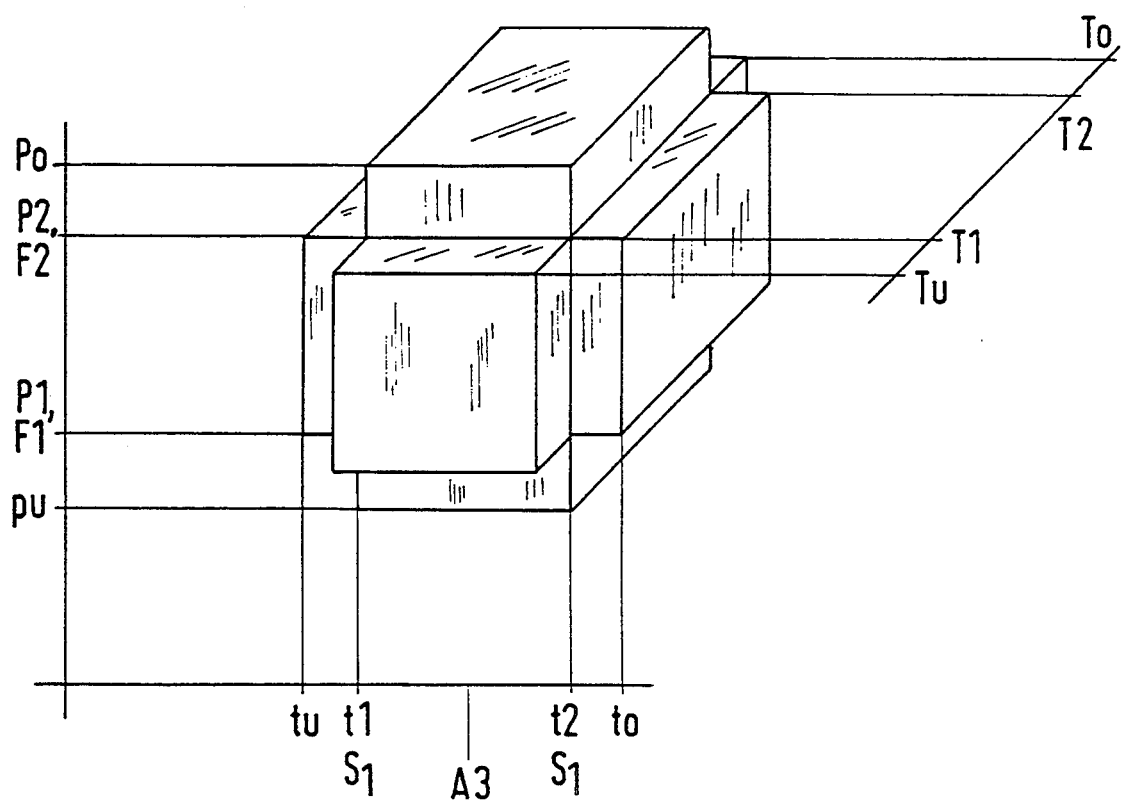
FIG. 4 is a perspective view of a change-over cube.

The change-over cube is shown in FIG. 4, in which the naming of the individual boundaries corresponds to that of FIGS. 2 and 3.

We claim:

1. In a machine for injection molding thermoplastic materials in a molding tool by seriatim injection cycles, wherein an injection pressure stage and a subsequent holding pressure stage are employed, and wherein parameters of a change-over point from the injection pressure to the holding pressure have a trend of varying, a method for regulating the trend of the change-over point in each injection cycle, which comprises (a) establishing upper and lower pressure, and right and left time boundary target parameters for a working window, (b) establishing upper and lower temperature boundary target parameters for a working band, (c) defining the change-over point within said working window, by specifying a pressure, at a given time, (d) measuring the actual pressure within the molding tool at the time of changing from the injection pressure to the holding pressure, and detecting any pressure and time differences from the boundary target parameters of the working window, (e) measuring the actual temperature within the molding tool and detecting any temperature differences from the boundary target parameters for the working band, (f) shifting the change-over point in proportion to the detected differences, subject to the conditions that the (i) changing of the time is in the same direction as any detected difference, (ii) changing of the pressure is in the opposite direction from any detected difference, and (iii) changing of the temperature in the same direction as the detected difference, and of the pressure is in the opposite direction of the detected difference.

2. The method of claim 1, wherein the extent of said shifting of the change-over point is carried out in proportion to the position of the changeover point in the working window.

3. The method of claim 2, wherein the extent of said shifting of the change-over point is carried out in proportion to the distance of the change-over point from the center of the working window.

4. The method of claim 1, further comprising retaining the parameters of the change-over points of each injection cycle.

5. The method of claim 4, further comprising monitoring predetermined process parameters as a function of the trend of variation of the change-over point in the working window.

6. The method of claim 5, further comprising monitoring the trend of pressure increases of molding tool temperature.

7. The method of claim 5, further comprising monitoring with each pressure drop the temperature of the thermoplastic material.

* * * * *